UNITED STATES PATENT OFFICE.

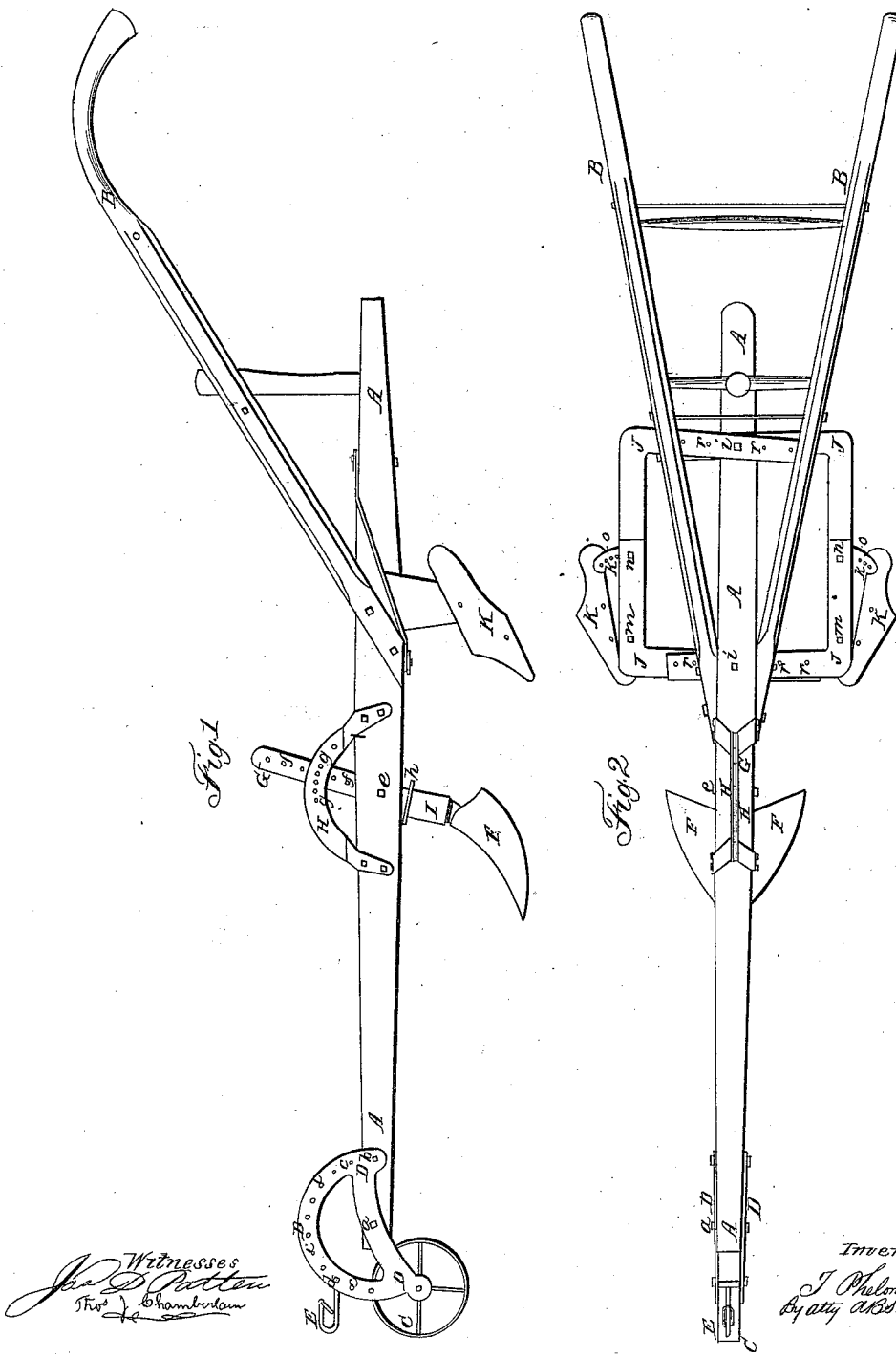

T. PHELON FISH, OF CRANE'S CORNERS, LITCHFIELD, NEW YORK.

IMPROVEMENT IN HORSE-HOES.

Specification forming part of Letters Patent No. 54,315, dated May 1, 1866.

*To all whom it may concern:*

Be it known that I, T. PHELON FISH, of Crane's Corners, in Litchfield, county of Herkimer, and State of New York, have invented certain new and useful Improvements in Horse-Hoes for Cultivating Hops, Potatoes, &c.; and I do hereby declare that the following is a full, clear, and exact description of the same, reference being had to the accompanying drawings, making a part of this specification, in which—

Figure 1 represents a side view, and Fig. 2 a top plan, of the horse-hoe.

Similar letters of reference, where they occur in the separate figures, denote like parts of the machine in both of the drawings.

My invention relates more particularly to the divided adjustable frame for carrying the side hoes or plows connected with the beam, which carries a central hoe or plow, said plows having lateral and vertical adjustments independent of the beam and frame, as well as an adjustment toward or from the furrows or land, as will be explained.

To enable others skilled in the art to make and use my invention, I will proceed to describe the same with reference to the drawings.

A represents a wooden beam furnished with handles B, by which it is guided and directed. At the point of the beam there is a wheel, C, hung in an arc, D, that is pivoted to the beam at *a* and made adjustable thereon by means of a pin or bolt at *b*, passing through one of the holes *c* in the arc and through the beam A. The clevis E is also secured to the arc D, and it may be moved up or down and secured in any of the holes *c* by a pin, *d*, passing through them, to which the clevis is secured. Thus the point of the beam, as well as the line or draft, are raised or lowered, so as to raise or lower the depth of furrow, as may be desired.

At or near the middle of the beam in length there is arranged a hoe or plow, F, the shank G of which is pivoted to the beam at *e*, and extending through the beam, passes between two arcs, H, secured on top of the beam, so that by means of the holes *f* in the shank and the holes *g* in the arcs the plow may be raised or lowered in the beam, or its point thrown downward or upward, so as to take more or less into the soil, as may be desired or the nature of the work may require.

The neck or shank of the plow F, under the beam, is furnished with a roller, I, which can freely turn on the shank, and it may have a flange, *h*, at its upper end. The object of this roller is to allow it to turn when any grass, vines, &c., should run up onto it, and thus free them or throw them off and prevent the plow from clogging.

Behind the plow F, and attached to the beam at *i i*, so as to be made adjustable thereon, is a sectional quadrangular frame, J, to which the side plows or hoes K are attached, and on which they can be set with their points turned to or from the center by means of the segments *k*, fastened to the shanks of the plows, and pivoted to the frame at *m*, and adjustable thereon by means of a pin, *n*, passing through the frame and through any of the holes *o* in the segments, *k*. The frame itself, by means of the holes *r*, can be contracted or expanded to bring the side plows nearer to or farther from the center of the land, or farther from or nearer to the plants that are to be cultivated.

Having thus fully described my invention, what I claim is—

In combination with a central plow carried by and adjustable on the beam, the side plow carried by and adjustable on a divided frame, which is also carried by and made adjustable on the beam, substantially as and for the purpose herein described.

T. PHELON FISH.

Witnesses:
B. E. DAVIS,
A. T. CRONKHITE.